United States Patent
Jesse et al.

(10) Patent No.: US 12,084,021 B2
(45) Date of Patent: Sep. 10, 2024

(54) METHOD FOR TESTING THE LEAK TIGHTNESS OF A HYDRAULIC VEHICLE BRAKING SYSTEM

(71) Applicant: Robert Bosch GmbH, Stuttgart (DE)

(72) Inventors: Tim-Philipp Jesse, Sachsenheim (DE); Otmar Bussmann, Abstatt (DE); Ralf Kinder, Auenstein (DE); Peter Ziegler, Grossbottwar (DE)

(73) Assignee: ROBERT BOSCH GMBG, Stuttgart (DE)

( * ) Notice: Subject to any disclaimer, the term of this patent is extended or adjusted under 35 U.S.C. 154(b) by 407 days.

(21) Appl. No.: 17/253,433

(22) PCT Filed: May 11, 2019

(86) PCT No.: PCT/EP2019/062112
§ 371 (c)(1),
(2) Date: Dec. 17, 2020

(87) PCT Pub. No.: WO2020/015886
PCT Pub. Date: Jan. 23, 2020

(65) Prior Publication Data
US 2021/0291800 A1 Sep. 23, 2021

(30) Foreign Application Priority Data
Jul. 19, 2018 (DE) .......................... 102018212018.8

(51) Int. Cl.
*B60T 17/22* (2006.01)
*G01M 3/26* (2006.01)

(52) U.S. Cl.
CPC .......... *B60T 17/222* (2013.01); *B60T 17/225* (2013.01); *G01M 3/26* (2013.01); *B60T 2270/406* (2013.01); *B60T 2270/88* (2013.01)

(58) Field of Classification Search
CPC ...... B60T 17/22; B60T 17/221; B60T 17/222; B60T 17/225; B60T 2270/406; B60T 2270/88; G01M 3/26
See application file for complete search history.

(56) References Cited

U.S. PATENT DOCUMENTS 6,401,015 B1   6/2002  Stewart et al.
6,439,031 B1 *  8/2002  Pieroni ................... G01M 3/20
                                              73/40.7

(Continued)

FOREIGN PATENT DOCUMENTS

DE        4405672 A1    8/1995
DE   102011005822 A1    9/2012

(Continued)

OTHER PUBLICATIONS

Ed Ruelas "How to Find and Repair a Brake Fluid Leak" May 9, 2016 (Year: 2016).*

(Continued)

*Primary Examiner* — Eric S. McCall
(74) *Attorney, Agent, or Firm* — NORTON ROSE FULBRIGHT US LLP; Gerard A. Messina

(57) ABSTRACT

To prevent the loss of any brake fluid from a hydraulic vehicle braking system after a detected leakage, a testing or a retesting of a leak tightness of the vehicle braking system is carried out only after release, for example, after a repair of the vehicle braking system.

5 Claims, 1 Drawing Sheet

(56) References Cited

U.S. PATENT DOCUMENTS

| | | | |
|---|---|---|---|
| 2002/0017129 A1* | 2/2002 | Duff | B60T 17/221 |
| | | | 73/40 |
| 2008/0154454 A1* | 6/2008 | Lehner | B60T 17/221 |
| | | | 701/112 |
| 2016/0297413 A1 | 10/2016 | Alford | |
| 2018/0050678 A1* | 2/2018 | Wolff | B60T 17/226 |
| 2019/0184958 A1* | 6/2019 | Watanabe | B60T 13/686 |
| 2020/0039495 A1* | 2/2020 | Henning | B60T 13/167 |
| 2020/0047734 A1* | 2/2020 | Foitzik | B60T 8/885 |
| 2020/0339096 A1* | 10/2020 | Timm | B60T 13/686 |
| 2021/0146906 A1* | 5/2021 | Ganzel | B60T 17/221 |
| 2021/0146908 A1* | 5/2021 | Ganzel | B60T 13/745 |
| 2021/0179041 A1* | 6/2021 | Matoy | B60T 17/22 |
| 2021/0318199 A1* | 10/2021 | Rosenberg | B60T 13/745 |
| 2021/0380259 A1* | 12/2021 | White | G01N 33/004 |
| 2022/0185254 A1* | 6/2022 | Nakayasu | B60T 13/662 |

FOREIGN PATENT DOCUMENTS

| | | |
|---|---|---|
| DE | 102013201571 A1 | 7/2014 |
| JP | 2003160045 A | 6/2003 |
| JP | 2005344865 A | 12/2005 |
| JP | 2009090803 A | 4/2009 |
| WO | 2015078635 A1 | 6/2015 |

OTHER PUBLICATIONS

International Search Report for PCT/EP2019/062112, Issued Jul. 2, 2019.

* cited by examiner

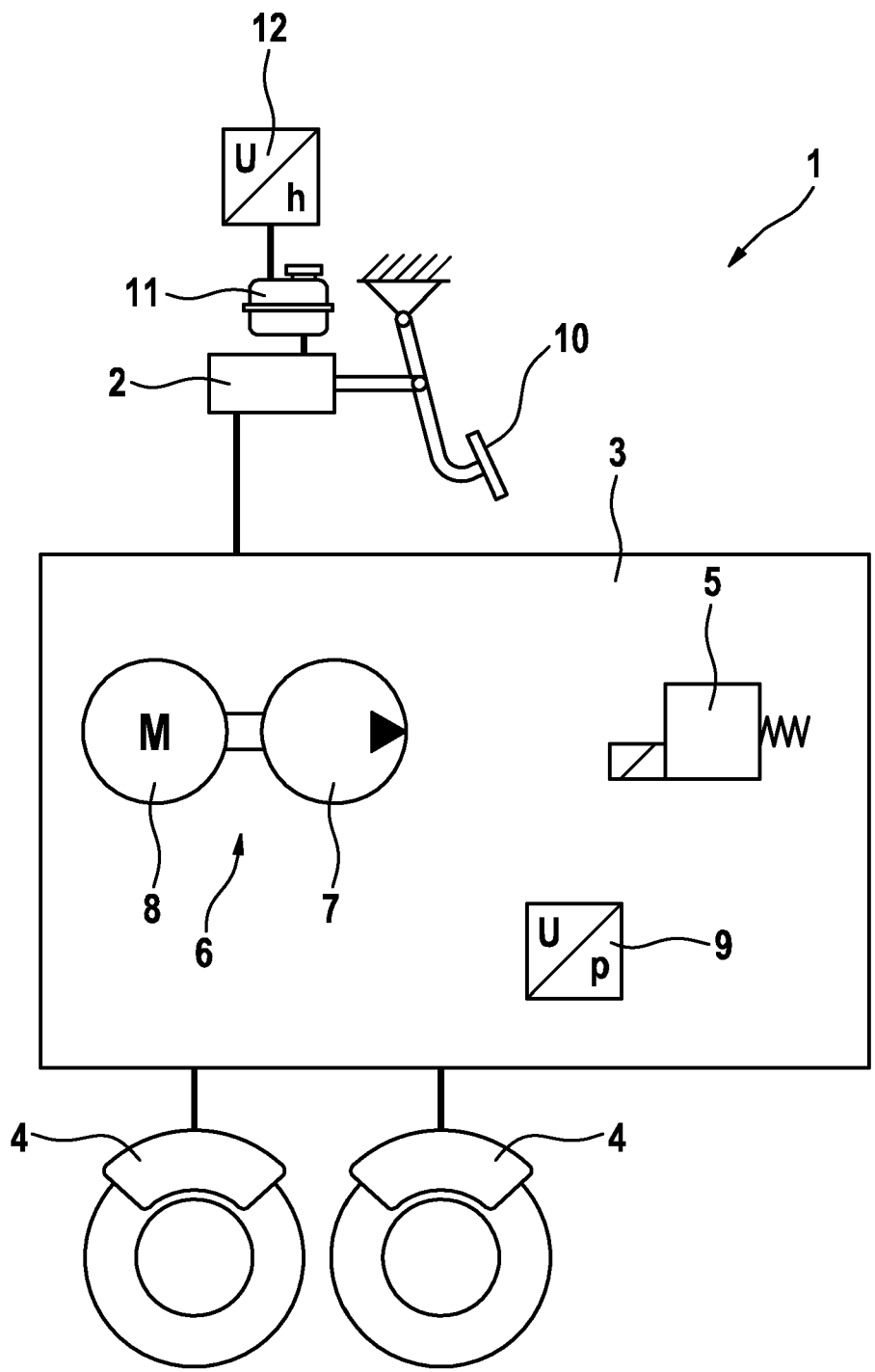

METHOD FOR TESTING THE LEAK TIGHTNESS OF A HYDRAULIC VEHICLE BRAKING SYSTEM

FIELD

The present invention relates to a method for testing the leak tightness of a hydraulic vehicle braking system. In particular, the method is for a vehicle braking system including a slip control and/or a vehicle power braking system or, in general, for a vehicle braking system including a power brake pressure generator.

SUMMARY

If a hydraulic vehicle braking system has a leakage, brake fluid is lost. Leakages due, for example, to the wear of seals, in the case of which brake fluid is lost only when a hydraulic brake pressure prevails in the vehicle braking system, i.e., when the vehicle braking system is actuated, are more frequent, although nevertheless rare, than leakages in the case of which brake fluid is permanently lost, i.e., even in the case of a pressureless vehicle braking system.

If a leakage of a hydraulic vehicle braking system is already known, the hydraulic vehicle braking system should not be tested for leak tightness, at least not when a hydraulic brake pressure is generated for the purpose of testing the leak tightness, since, as a result, brake fluid is unnecessarily lost, which is lacking for an application of the brakes.

Therefore, the present invention provides that a testing of the leak tightness of a hydraulic vehicle braking system, at which a leakage has been detected, is carried out only after a release.

The release takes place, for example, after a repair of the vehicle braking system, in order to then carry out a leak tightness test to establish whether the repair was successful and/or to carry out routine leak tightness tests at, for example, established time intervals and/or after established mileage traveled by a vehicle equipped with the vehicle braking system.

In accordance with an example embodiment of the present invention, one criterion for the release of the leak tightness test may be a sufficient fill level in a brake fluid reservoir of the vehicle braking system, this criterion being applied regardless of the detection of a leakage of the vehicle braking system or only after a leakage of the vehicle braking system has been detected. The sufficient fill level in the brake fluid reservoir is usually established by the manufacturer of the vehicle braking system, by component manufacturers of the vehicle braking system, or by the manufacturer of a vehicle equipped with the vehicle braking system and ensures an amount of brake fluid in the brake fluid reservoir, which is sufficient for a reliable actuation of the vehicle braking system for any possible braking operation also in the case of consecutive applications of the brakes.

In accordance with an example embodiment of the present invention, another criterion for the release of the leak tightness test is a speed of a build-up of brake pressure upon actuation of the vehicle braking system. If, upon actuation of the vehicle braking system, the brake pressure increases more slowly than usual or more slowly than is to be expected, this is an indication of a possible leakage. A leak tightness test is carried out in this case only when the vehicle braking system is serviced or repaired and/or the leakage or leak tightness of the vehicle braking system is tested and the leak tightness test has been released. The period of time until an established brake pressure has been reached, for example, may be selected as the criterion for the speed of the build-up of brake pressure. The speed of the build-up of brake pressure upon actuation of the vehicle braking system is applied as the criterion for the release of the leak tightness test, in particular upon a power actuation of the vehicle braking system, since, in contrast to a muscle power actuation or an auxiliary power actuation, the build-up of brake pressure upon a power actuation always takes place at the same speed, at least theoretically, and, therefore, is a reliable criterion for determining whether or not the vehicle braking system is in order. An auxiliary power actuation is a muscle power actuation reinforced by external power, for example, of a brake booster.

The criteria explained above for the release of the leak tightness test are examples, which do not rule out other criteria. The criteria for the release of the leak tightness test may be applied individually or in a basically arbitrary combination. Individual criteria, such as the fill level in the brake fluid reservoir or the speed of the build-up of brake pressure upon an, in particular, power actuation of the vehicle braking system, may also be applied, without a leakage having been previously detected. The fulfillment of these two criteria is already an indication of a possible leakage of the vehicle braking system.

The method according to the present invention is intended, in particular, for vehicle braking systems including a power brake pressure generator, which does not rule out a muscle power brake pressure generator or an auxiliary power brake pressure generator. A muscle power brake pressure generator is typically a hand- or foot-actuatable main brake cylinder and an auxiliary power brake pressure generator is such a main brake cylinder including a brake booster. A power brake pressure generator typically includes an electric motor for its drive and a hydraulic pump or a piston-cylinder unit for generating brake pressure. Hydraulic pumps of power brake pressure generators of hydraulic vehicle braking systems are frequently piston pumps, which are occasionally also referred to as pump elements and include a piston-cylinder unit, or gear pumps, in particular internal gear pumps. Such power brake pressure generators are present in slip controlled hydraulic vehicle braking systems, where they are often also referred to as recirculating pumps, and in vehicle power braking systems, where vehicle power braking systems may also include a slip controller. Slip controllers are, for example, an anti-lock system, a traction slip control system and/or a vehicle dynamics system or an electronic stability program, the latter often being referred to colloquially as anti-slip regulation. The abbreviations ABS, ASR, VDR, and ESP are common for these slip controllers. Slip controllers are conventional and are not explained here.

BRIEF DESCRIPTION OF THE DRAWINGS

The present invention is explained in greater detail in the following with reference to a specific embodiment represented in the FIGURE.

The sole FIGURE shows a simplified hydraulic diagram of a hydraulic vehicle braking system for carrying out the method according to an example embodiment of the present invention.

DETAILED DESCRIPTION OF EXAMPLE EMBODIMENTS

Hydraulic vehicle braking system 1 represented in the drawing includes a muscle power-actuatable main brake cylinder 2, a brake pressure control valve system 3, and one or multiple hydraulic wheel brake (s) 4, which is/are connected to main brake cylinder 2 via brake pressure control valve system 3. Two wheel brakes 4 are shown. For a passenger car, vehicle braking system 1 typically encompasses two brake circuits and four wheel brakes 4, of which two are assigned to one brake circuit in each case.

Brake pressure control valve system 3 includes solenoid valves 5 for brake pressure control and a power brake pressure generator 6 encompassing a hydraulic pump 7 and an electric motor 8 for its drive. Further components of brake pressure control valve system 3, such as check valves, hydraulic accumulators, damper chambers, are not shown. Moreover, brake pressure control valve system 3 encompasses one or multiple pressure sensor (s) 9 for controlling a brake pressure. With the aid of brake pressure control valve system 3, the control of the brake pressure in vehicle braking system 1 is possible in the case of a brake application by muscle power and/or a power brake application, "regulation" also encompassing a "control" of the brake pressure. In the case of a brake application by muscle power, main brake cylinder 2 is actuated with the aid of a foot brake pedal 10 or a hand brake lever (not shown) and, as a result, a hydraulic brake pressure is generated in vehicle braking system 1. In the case of a power brake application, hydraulic pump 7 of power brake pressure generator 6 is driven with the aid of electric motor 8 and, as a result, a hydraulic brake pressure is generated in vehicle braking system 1.

Hydraulic pump 7 is, for example, a piston pump or an (internal) gear pump. In slip controlled vehicle braking systems, such hydraulic pumps 7 are also referred to as recirculating pumps.

With the aid of brake pressure control valve system 3, a slip control is also possible, such as an anti-lock system, a traction slip control system and/or an electronic stability program or vehicle dynamics system, the latter two often also being referred to colloquially as anti-slip regulation. The abbreviations ABS, ASR, VDR, and ESP are common for these slip controllers. Such slip controllers are conventional and are not explained here. A slip control is possible in the case of a brake application by muscle power as well as in the case of a power brake application. In the case of slip controllers, wheel brake pressures are normally controlled individually wheel-specifically in each wheel brake 4.

The present invention provides that, after a leakage of vehicle braking system 1 has been detected, a leak tightness test is carried out only after a release, in order not to lose brake fluid from untight vehicle braking system 1 due to the leak tightness test, which would then no longer be available for brake applications. The release may take place after a repair of vehicle braking system 1, in order to test the leak tightness of vehicle braking system 1 and, therefore, the success of the repair.

In order to test the leak tightness, for example, a hydraulic brake pressure is generated in vehicle braking system 1 with the aid of power brake pressure generator 6 and main brake cylinder 2 is hydraulically separated from vehicle braking system 1 or from brake pressure control valve system 3 by closing a separating valve (not represented individually) in each brake circuit, so that hydraulic pump 7 of power brake pressure generator 6 does not displace brake fluid out of vehicle braking system 1 via main brake cylinder 2 into a pressureless brake fluid reservoir 11, which is mounted onto main brake cylinder 2. If the brake pressure in vehicle braking system 1 drops after power brake pressure generator 6 is switched off, this means vehicle braking system 1 is untight. The leak tightness of vehicle braking system 1 is then tested again, according to the present invention, only after a release, for example, after the repair of vehicle braking system 1.

Another criterion for carrying out the leak tightness test is a fill level in brake fluid reservoir 11: If the fill level in brake fluid reservoir 11 is less than an established minimum, a leak tightness test is not carried out, in order not to lose any brake fluid due to the leak tightness test. The minimum of the fill level in brake fluid reservoir 11 is established in such a way that brake fluid sufficient for any possible braking operation, also for repeated application of the brakes, is present in brake fluid reservoir 11 for the application (s) of the brakes. The fill level of brake fluid reservoir 11 is measured with the aid of a fill level sensor 12. The criterion of the at least minimum fill level in brake fluid reservoir 11 may be applied regardless of or after a previously detected leakage of vehicle braking system 1.

In order to test whether air is present in a piston-cylinder unit as hydraulic pump 7 of power brake pressure generator 6, the piston-cylinder unit is hydraulically separated from the remaining vehicle braking system by closing a valve 5 and the piston is displaced in the cylinder within the scope of a pressure build-up. If the cylinder is filled with brake fluid, the piston and electric motor 8 do not move or move hardly at all due to the incompressibility of brake fluid, the pressure in the cylinder increases abruptly and a current consumption of electric motor 8 is high. If air is present in the cylinder, the piston and electric motor 8 move and are decelerated, the current consumption drops after a start-up of electric motor 8 and then increases again and the pressure in the cylinder increases. In this case, a leak tightness test is not carried out until the vehicle braking system has been repaired or at least brake fluid reservoir 11 has been filled, which may also be construed as a repair of vehicle braking system 1. This test is preferably carried out before the beginning of a trip, i.e., for example, when a vehicle door is unlocked or opened or when an ignition is switched on.

One possibility for testing whether the fill level in brake fluid reservoir 11 suffices is to initially displace brake fluid out of power brake pressure generator 6 into brake fluid reservoir 11 and, thereafter, to draw in brake fluid out of brake fluid reservoir 11 again with the aid of power brake pressure generator 6. If no brake fluid is contained in brake fluid reservoir 11, power brake pressure generator 6 draws in air out of brake fluid reservoir 11, thereafter, due to which a pressure build-up with the aid of power brake pressure generator 6 is no longer possible, which is measurable with the aid of one of pressure sensors 9. If the fill level in brake fluid reservoir 11 is too low, power brake pressure generator 6 draws in a mixture of brake fluid and air, which impairs a subsequent pressure build-up with the aid of power brake pressure generator 6. This is also measurable with the aid of pressure sensor 9. In both cases, no further leak tightness tests are carried out until brake fluid reservoir 11 has been filled and, if necessary, vehicle braking system 1 has been repaired. This method is intended, in particular, for a power brake pressure generator 6, which includes a piston pump or a piston-cylinder unit as a hydraulic pump 7.

Another criterion for the release of the leak tightness test is a speed of the brake pressure build-up in vehicle braking system 1 with the aid of power brake pressure generator 6, since power brake pressure generator 6 always generates the brake pressure at the same speed, at least theoretically. If the brake pressure build-up is slower than it normally is or than would be anticipated, this may be an indication of a possible leakage of vehicle braking system 1. In this case, a leak tightness test of vehicle braking system 1 is not carried out again before a release. The criterion of the speed of the brake pressure build-up in vehicle braking system 1 with the aid of power brake pressure generator 6 may also be applied regardless of a previously detected leakage of vehicle braking system 1. In order to detect the speed of the brake pressure build-up, for example, a period of time until a predefined brake pressure has been reached in vehicle braking system 1 or the brake pressure reached in vehicle braking system 1 after a predefined period of time may be measured when the brake pressure is generated with the aid of power brake pressure generator 6.

The criteria for the release of the leak tightness test may be applied independently of one another or also in basically arbitrary combinations.

What is claimed is:

1. A method for a hydraulic vehicle braking system that includes a brake pressure generator for generating a hydraulic brake pressure in the vehicle braking system, the method comprising:
   detecting a leakage of the vehicle braking system; and
   after the detecting of the leakage, determining whether a fill level in a brake fluid reservoir of the vehicle braking system is at least as high as a predefined threshold level; and
   conditional upon that a result of the determining is that the fill level is at least as high as the predefined threshold level, performing a test of a sufficiency of a tightness of the hydraulic braking system to prevent a leak of brake fluid out of the hydraulic vehicle braking system;
   wherein the method includes at least one of the following two features (a)-(b):
      (a) the determining of whether the fill level in the brake fluid reservoir is at least the predefined threshold level is performed by:
         initially displacing brake fluid out of the brake pressure generator into the brake fluid reservoir;
         subsequent to the displacement, drawing in from the brake fluid reservoir using the brake pressure generator; and
         subsequent to the drawing in, testing a brake pressure build-up using the brake pressure generator; and
      (b) the brake pressure generator is a power brake pressure generator that includes a motor and a hydraulic pump configured to be operated by the motor to generate the hydraulic brake pressure independently of a shifting of a manually operated brake pedal.

2. The method as recited in claim 1, wherein the determining is performed by:
   the initial displacement of the brake fluid out of the brake pressure generator into the brake fluid reservoir;
   subsequent to the displacement, the drawing in from the brake fluid reservoir using the brake pressure generator; and
   subsequent to the drawing in, the testing of the brake pressure build-up using the brake pressure generator.

3. The method as recited in claim 1, wherein the brake pressure generator is the power brake pressure generator that includes the motor and the hydraulic pump configured to be operated by the motor to generate the hydraulic brake pressure independently of the shifting of the manually operated brake pedal.

4. A method for a hydraulic vehicle braking system that includes a power brake pressure generator, the power brake pressure generator including a piston-cylinder unit, the method comprising:
   detecting a leakage of the vehicle braking system; and
   after the detecting of the leakage:
      hydraulically separating the piston-cylinder unit from another portion of the vehicle braking system by closing a valve;
      applying a displacement force to a piston of the piston-cylinder unit in a cylinder of the piston-cylinder unit for a pressure build-up; and
      carrying out a test of a sufficiency of a tightness of the hydraulic braking system to prevent a leak of brake fluid out of the hydraulic vehicle braking system;
   wherein the method further comprises at least one of:
      measuring a pressure change generated by the application of the displacement force, wherein the carrying out of the test is performed conditional upon that the measurement indicates a pressure increase at at least a predefined rate; and
      measuring a movement of the piston, wherein the carrying out of the test is performed conditional upon that the measurement indicates that the piston has not shifted in the cylinder or has not shifted in the cylinder by a predetermined amount.

5. A method for a hydraulic vehicle braking system that includes a brake pressure generator for generating a hydraulic brake pressure in the vehicle braking system, the method comprising:
   detecting a leakage of the vehicle braking system; and
   after the detecting of the leakage:
      measuring a speed of a brake pressure build-up in the vehicle braking system using the brake pressure generator; and
      based on the measurement, carrying out a test of a sufficiency of a tightness of the hydraulic braking system to prevent a leak of brake fluid out of the hydraulic vehicle braking system, the test being performed conditional upon that a result of the measurement is that the speed is at least as fast as a predefined threshold speed.

* * * * *